(12) United States Patent
Haacke

(10) Patent No.: US 9,229,122 B2
(45) Date of Patent: Jan. 5, 2016

(54) IMAGE-DOMAIN 4D-BINNING METHOD AND SYSTEM

(71) Applicant: CGGVERITAS SERVICES SA, Massy (FR)

(72) Inventor: Ross Haacke, Reigate (GB)

(73) Assignee: CGGVERITAS SERVICES SA, Massy (FR)

( * ) Notice: Subject to any disclaimer, the term of this patent is extended or adjusted under 35 U.S.C. 154(b) by 481 days.

(21) Appl. No.: 13/784,112

(22) Filed: Mar. 4, 2013

(65) Prior Publication Data

US 2014/0247693 A1 Sep. 4, 2014

(51) Int. Cl.
*G01V 1/30* (2006.01)
*G01V 1/36* (2006.01)

(52) U.S. Cl.
CPC .............. *G01V 1/308* (2013.01); *G01V 1/366* (2013.01); *G01V 2210/51* (2013.01); *G01V 2210/612* (2013.01)

(58) Field of Classification Search
CPC ... G01V 1/308; G01V 1/366; G01V 2210/51; G01V 2210/612
USPC .......................................................... 367/38
See application file for complete search history.

(56) References Cited

U.S. PATENT DOCUMENTS

| 4,800,539 | A | * | 1/1989 | Corn et al. | 367/72 |
| 6,438,069 | B1 | * | 8/2002 | Ross et al. | 367/73 |
| 8,339,898 | B2 | | 12/2012 | Smith et al. | |
| 2008/0170468 | A1 | | 7/2008 | Brain et al. | |

OTHER PUBLICATIONS

Girard et al., "Image-domain time-lapse inversion with extended images," SEG Denver 2010 Annual Meeting, 5 pp.*
Perrone et al., "Shot-domain 4D time-lapse velocity analysis using apparent image displacements," from SEG Technical Program Expanded Abstracts 2013, 6 pp.*
Rodney Calvert, "Insights and Methods for 4D Reservoir Monitoring and Characterization", Distinguished Instructor Short Course, Series No. 8, Society of Exploration Geophysicists, European Association of Geoscientists & Engineers, 2005.
P.J. Smith et al., "Simultaneous time-lapse Binning and Regularization of 4D Data", 74th EAGE Conference & Exhibition incorporating SPE EUROPEC 2012, Copenhagen, Denmark, Jun. 4-7, 2012.
E. Zabihi Naeini et al., "Simultaneous Multi-vintage 4D Binning", 71st EAGE Conference & Exhibition, Amsterdam, The Netherlands, Jun. 8-11, 2009.
S.-K. Foss et al., "4D Angle Migration without Data Regularization", 73rd EAGE Conference & Exhibition incorporating SPE EUROPEC 2011, Vienna, Austria, May 23-26, 2011.

* cited by examiner

*Primary Examiner* — Daniel L Murphy
(74) *Attorney, Agent, or Firm* — Patent Portfolio Builders PLLC

(57) ABSTRACT

A method for increasing similarity between a base seismic survey and a monitor seismic survey of a same surveyed subsurface during a 4-dimensional (4D) project. The method includes receiving first seismic data associated with the base seismic survey; receiving second seismic data associated with the monitor seismic survey, wherein the monitor seismic survey is performed later in time than the base seismic survey; migrating the first and second seismic data to an image-domain; and calculating, with a processor, a set of decimating weights based on the migrated first and second seismic data in the image-domain, to maximize a similarity between the first seismic data and the second seismic data.

20 Claims, 7 Drawing Sheets

IMAGE-DOMAIN 4D-BINNING METHOD AND SYSTEM

BACKGROUND

1. Technical Field

Embodiments of the subject matter disclosed herein generally relate to methods and systems and, more particularly, to mechanisms and techniques for 4-dimensional (4D) binning seismic data collected with different acquisition geometries.

2. Discussion of the Background

Marine seismic data acquisition and processing generate an image of a geophysical structure (subsurface) under the seafloor. While this image/profile does not provide a precise location for oil and gas reservoirs, it suggests, to those trained in the field, the presence or absence of oil and/or gas reservoirs. Thus, providing a high-resolution image of the subsurface is an ongoing process for the exploration of natural resources, including, among others, oil and/or gas.

During a seismic gathering process, as shown in FIG. 1, a vessel 10 tows an array of seismic receivers 11 located on streamers 12. The streamers may be disposed horizontally, i.e., lying at a constant depth relative to the ocean surface 14, or may have spatial arrangements other than horizontal, e.g., variable-depth arrangement. The vessel 10 also tows a seismic source array 16 configured to generate a seismic wave 18. The seismic wave 18 propagates downward, toward the seafloor 20, and penetrates the seafloor until, eventually, a reflecting structure 22 (reflector) reflects the seismic wave. The reflected seismic wave 24 propagates upward until it is detected by receiver 11 on streamer 12. Based on this data, an image of the subsurface is generated.

Alternatively, ocean bottom cables (OBC) or ocean bottom nodes (OBN) and seismometers (OBS) may be used to record the seismic data. FIG. 2 shows an OBC 30 that includes plural receivers 32 distributed on the ocean bottom 20, which may be connected to each other (or may be independent OBN/OBS) with a cable 33 that may also be connected to a data collection unit 34. Various means (e.g., underwater vehicle) may be used to retrieve the seismic data from the data collection unit 34 and bring it on the vessel 10 for processing.

One or more of the above-noted techniques may be used to monitor a producing reservoir. For these instances, the goal of 4D processing is to determine how and where earth properties change by evaluating differences in co-processed seismic data acquired at different times, usually before (i.e., the baseline survey) and after (i.e., the monitor survey) a period of fluid production from a petroleum reservoir.

Success of 4D processing depends on how well differences in acquisition are compensated for during data processing and imaging. If these differences are accurately compensated, changes in the subsurface that are related to fluid production can be identified by areas of significant difference between baseline and monitor images after migration. Failure of data processing to accurately compensate for acquisition differences leads to creation of 4D noise, which is an appreciable difference of baseline and monitor migrated images not caused by fluid production and, thus, is unwanted.

A sensitive step of 4D processing is the selection of subsets of the base and monitor data that have similar information content and similar wavefield sampling. If this similarity selection is accurately performed, the level of 4D noise in the migrated images is much reduced. This data selection is commonly achieved by 4D-binning, as described in Brain et al., US Patent 20080170468 A1, and Zahibi et al. (2009, "Simultaneous multi-vintage 4D binning," 71$^{st}$ EAGE Conference and Exhibition, Extended Abstracts), the contents of both documents being incorporated herein by reference. Traditional 4D-binning selects traces from the base and monitor surveys for further processing based on a set of criteria designed to assess their degree of similarity. All prior work on this topic uses similarity criteria evaluated in the data domain (i.e., before migration).

For example, Brain et al. discloses a method for processing at least two sets of seismic data, each dataset comprising several seismic traces (i,j) grouped by bins (B_i, B_j) and by offset classes (O_i, O_j). This method includes the following steps: calculating at least one attribute (a(i,j)) characteristic of a similarity between a first trace (i) of a first dataset and a second trace (j) of a second dataset, and selecting or not the first and second traces (i,j) according to a selection criterion applied to the calculated attribute (a(i,j)).

This method explicitly groups the traces by bin and offset classes to facilitate the 4D-binning process, which aims to decimate the baseline and monitor surveys to a common level of information and wavefield sampling. The method described by Brain et al. and Zahibi et al. is now widely used in the geophysical industry, and assesses similarity of the traces using surface attributes of the baseline and monitor surveys, for example, the geographic position of traces defined by shot and receiver locations, or by mid-point location and/or offset and/or azimuth. Alternative measures are also based on data-domain trace attributes such as cross-correlation. In other words, traditional 4d-binning methods use a data-domain-related attribute (similarity) to group the traces.

The above-discussed 4D-binning processes work well when the baseline and monitor surveys have similar acquisition geometry, for example, a towed-streamer base and a towed-streamer monitor acquired in similar positions but at different times. However, when the base and monitor surveys have different acquisition geometries, for example, a towed-streamer base and sparse OBN monitor, the surface or data-domain trace attributes used to measure similarity in the 4D-binning process are not a good proxy for similarity of the data's information content, and/or of the wavefield sampling in the datasets.

Differences in both information content and wavefield sampling lead to generation of 4D noise. Therefore, it is desirable to address acquisition differences through more accurate methods of data decimation (more accurate methods for 4D-binning).

The problem of decimating two different datasets to a common level of information and wavefield sampling is also addressed in U.S. Pat. No. 8,339,898 (herein '898), the entire content of which is incorporated herein by reference. The 4D-binning method described in '898 decimates the baseline and monitor data by evaluating similarity using a measure based jointly on (i) interpolation to a common and regular surface geometry, and (ii) surface or data-domain trace attributes (as commonly used in 4D-binning). More specifically, '898 discloses a method that includes, inter alia, computing measures associated with regularization of the seismic data, and computing measures associated with 4D-binning, where the 4D-binning includes selecting traces from the seismic data of time-lapse seismic surveys and discarding at least one trace of the seismic data that is based on considering both the regularization measures and the 4D-binning measures.

The use of an interpolation engine to map data to a common and regular data domain (with base and monitor traces occupying the same geographic locations defined by their shot and receiver positions) facilitates the 4D-binning process by providing a further measure of similarity. Interpolating to a common data domain would reduce the differences of wavefield sampling, with differences in information content evaluated by the simultaneous inclusion of surface or data-domain trace attributes in the 4D-binning process.

However, where the baseline and monitor surveys have very different acquisition geometry, such as towed-streamer base and sparse OBN monitor, the interpolation of traces to a common surface data domain does not ensure common levels of wavefield sampling. Furthermore, the evaluation of similarity using surface or data-domain trace attributes cannot accurately measure similarity of information content, since the grouping of traces by surface attributes does not allow the comparison of similar parts of the seismic wavefield.

The problem of matching two datasets with very different acquisition geometries is addressed in Provisional Patent Application 61/752,626 (herein '626), "Wavefield modelling and 4D-binning for time-lapse processing of surveys from different acquisition datums," the entire disclosure of which is incorporated herein by reference. In '626, matching is addressed by the use of subsurface wavefield modeling. The subsurface modeling described in '626 uses ray-tracing to a target horizon, with or without re-datuming of data to a more convenient geometry, to define the subsurface reflection points and incidence angles that should be matched in 4D-binning. The similarity measure used in '626 is made after grouping traces by their subsurface properties (reflection points and incidence angles). Thus, the method incorporates an estimate of subsurface reflection properties, but the subsurface modeling is limited to reflections on a target horizon. Furthermore, where a choice of trace pairs exists for a single estimated reflection point and incidence angle, the similarity measures used to select traces resorts to surface or data-domain trace attributes (albeit ones applied to traces grouped by subsurface properties).

One weakness of the above-discussed 4D-binning methods is the reliance on grouping together of traces from the baseline and monitor prior to evaluating their similarity. Where the acquisition geometries of baseline and monitor are very similar and have similar positioning, these methods work well. However, the situation is different when the acquisition geometries are significantly different; trace grouping based on surface attributes (such as offset or spatial trace bin) cannot ensure that the right part of the monitor dataset is being compared with the equivalent part of the baseline dataset. Where the subsurface modeling technique is used as described in '626, the trace grouping is more accurate, but it still requires data-domain measures of similarity where a choice of traces exists.

Thus, there is a need for a new 4D-binning method that does not suffer from the limitations noted above.

SUMMARY

According to an exemplary embodiment, there is a method for increasing similarity between a base seismic survey and a monitor seismic survey of a same surveyed subsurface during a 4-dimensional (4D) project. The method includes receiving first seismic data associated with the base seismic survey; receiving second seismic data associated with the monitor seismic survey, wherein the monitor seismic survey is performed later in time than the base seismic survey; migrating the first and second seismic data to an image-domain; and calculating, with a processor, a set of decimating weights based on the migrated first and second seismic data in the image-domain, to maximize a similarity between the first seismic data and the second seismic data.

According to another exemplary embodiment, there is a computing device for increasing similarity between a base seismic survey and a monitor seismic survey of a same surveyed subsurface during a 4-dimensional (4D) project. The computing device includes an interface configured to receive first seismic data associated with the base seismic survey and second seismic data associated with the monitor seismic survey, wherein the monitor seismic survey is performed later in time than the base seismic survey; and a processor connected to the interface. The processor is configured to migrate the first and second seismic data to an image-domain, and calculate a set of decimating weights based on the migrated first and second seismic data in the image-domain, to maximize a similarity between the first seismic data and the second seismic data.

According to still another embodiment, there is a non-transitory computer readable medium including computer executable instructions, wherein the instructions, when executed by a computer, implement the method discussed above.

BRIEF DESCRIPTION OF THE DRAWINGS

The accompanying drawings, which are incorporated in and constitute a part of the specification, illustrate one or more embodiments and, together with the description, explain these embodiments. In the drawings.

DETAILED DESCRIPTION

The following description of the exemplary embodiments refers to the accompanying drawings. The same reference numbers in different drawings identify the same or similar elements. The following detailed description does not limit the invention. Instead, the scope of the invention is defined by the appended claims. The following embodiments are discussed, for simplicity, with regard to seismic data collected during a base survey and a monitor survey, wherein the base survey was conducted with streamers and the monitor survey was conducted with ocean bottom nodes (OBNs). However, the embodiments to be discussed next are not limited to these kinds of surveys. For example, the novel embodiments may be applied to a base survey conducted with OBNs and a monitor survey conducted with streamers. More generally, the novel embodiments are successful for base and monitor seismic surveys that may have different information content and/or wavefield sampling.

Reference throughout the specification to "one embodiment" or "an embodiment" means that a particular feature, structure or characteristic described in connection with an embodiment is included in at least one embodiment of the subject matter disclosed. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

Figure 1:
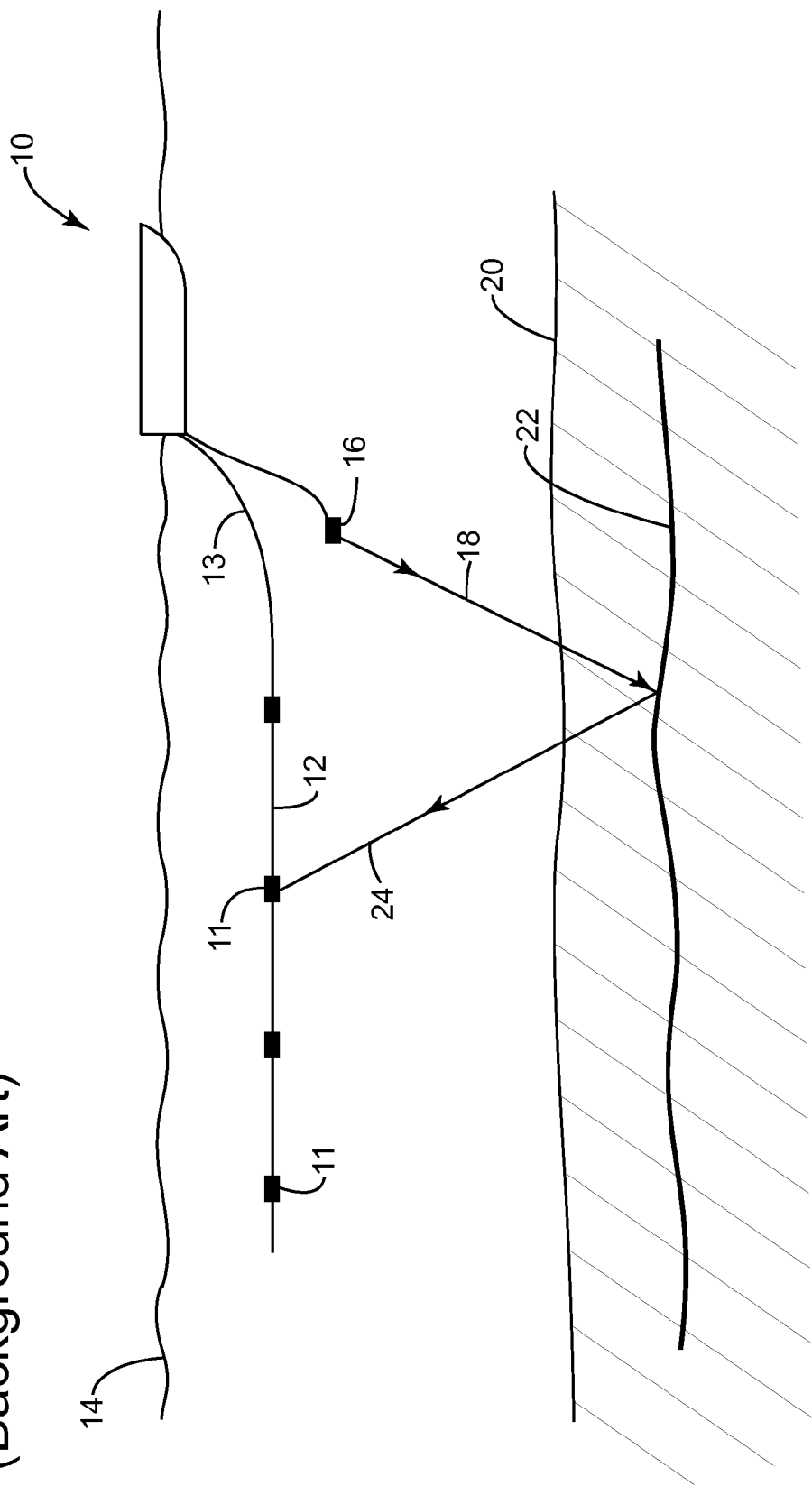
FIG. 1 is a schematic diagram of a conventional seismic data acquisition system having plural seismic receivers on streamers.
Figure 2:
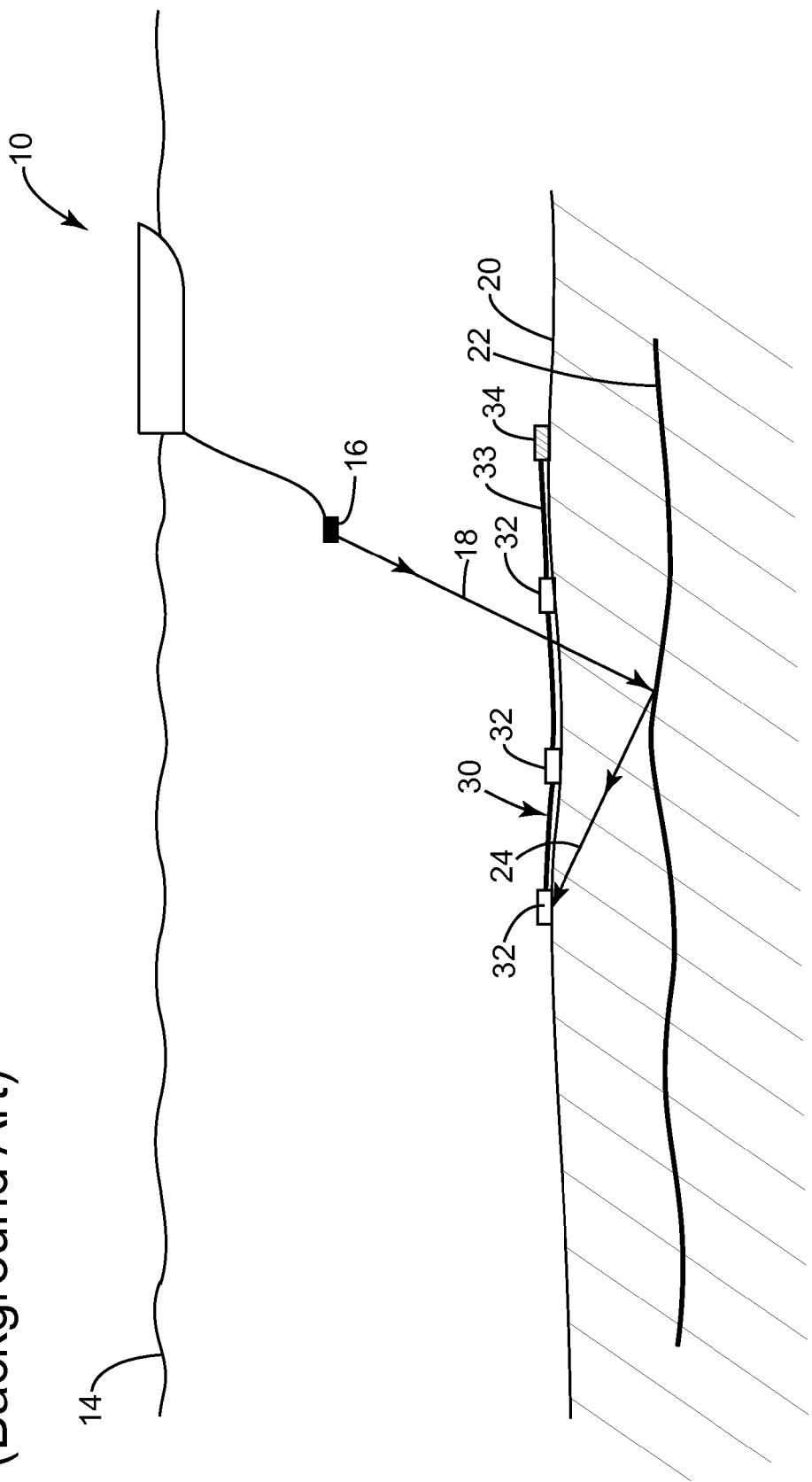
FIG. 2 is a schematic diagram of a conventional seismic data acquisition system having plural seismic receivers located at the ocean bottom.
Figure 3:
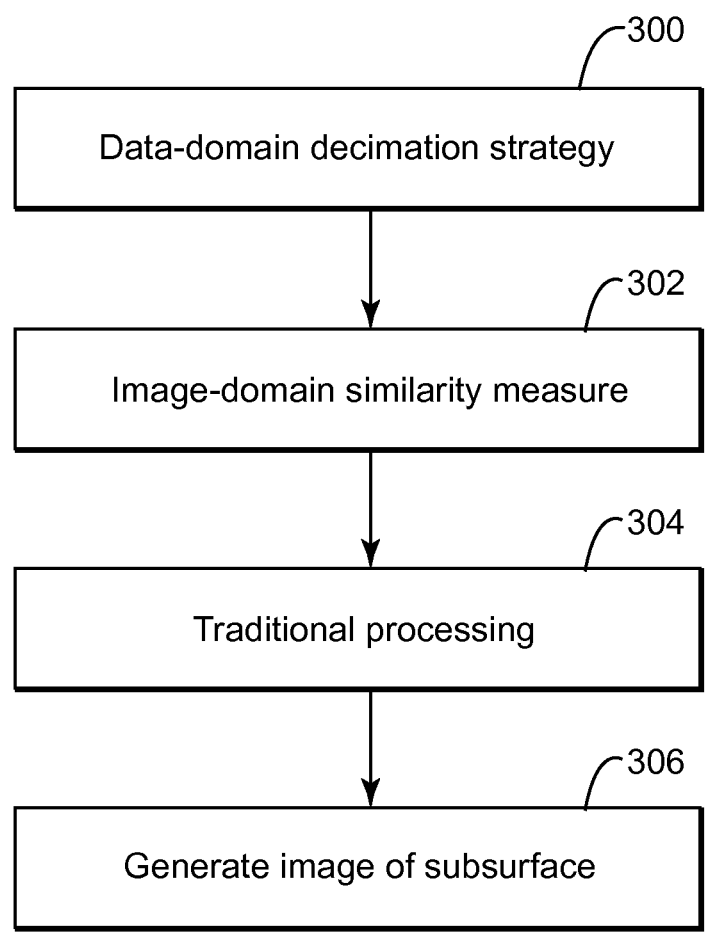
FIG. 3 is a flowchart illustrating a novel method for 4D-binning according to an exemplary embodiment.

According to an exemplary embodiment, a new method of matching two datasets, in a 4D sense, is discussed. The novel method, as schematically illustrated in FIG. 3, uses a step 300 of data-domain decimation strategy that is linked to a step 302 of using an image-domain similarity measure. This combination of (i) data-domain decimation and (ii) image-domain similarity measure represents an advance over the standard use of data-domain attributes in 4D-binning. Then, traditional processing is applied in step 304 (e.g., migration) on the data binned as described in steps 300 and 302, and a final image of the surveyed subsurface is generated in step 306.

In this respect, as discussed above, similarity measures based on data-domain attributes or trace grouping cannot accurately match traces from very different acquisition geometries (e.g., towed-streamer and ocean-bottom data). However, a more accurate match can be obtained by evaluating the need for decimation of baseline and monitor datasets in the common migrated-image domain. This novel method, which is discussed in more detail next, is applicable in the 4D processing of towed-streamer and ocean-bottom node datasets, or of other datasets with very different acquisition geometries.

The novel method relies on linking the subsurface image (I) of baseline and monitor datasets to a set of decimating weights (w) which reduce the input datasets (d) to a common level of information and wavefield sampling. The decimating weights may be estimated by requiring the output images to be equal (e.g., in a least-squares sense, or equivalently with other minimizing norms) when using sections of the input dataset known to correspond to stationary parts of Earth. Optionally, the estimating problem can be conditioned by requiring the set of decimating weights to have minimum gradient (thus, promoting similarity of weights for adjacent traces), or to have minimum total magnitude on the complementary set of weights (thus, maximizing the data that survives the process and preventing the trivial solution of all data being weighted to zero). In one application, the decimating weights may be determined as a function varying sample by sample, or varying trace by trace. In another application, no explicit grouping of traces is required in the image-domain 4D-binning method.

The novel method is now discussed in more detail and based on a simple example. Consider a matrix A that holds, on its rows, coefficients of a diffraction-stack migration, or of a Kirchhoff migration (or any known migration). Those skilled in the art are familiar with these types of migrations and, for this reason, no details are provided about them. The matrix (also called transform) A maps seismic data d onto a migrated image $I_a$. The transform A models a propagation of the wavefields in the subsurface via ray-tracing through an arbitrary subsurface model. Coefficients in A's rows are placed such that multiplication of each row of A with the data vector d achieves the Kirchhoff integral for a particular image point (the image point is represented by the row of the image vector $I_a$). Subscript a on the image vector indicates an evaluation of the image at a specific ensemble of points in the image domain that do not have to be regularly distributed. If subscript b is used to indicate the baseline survey, migration of this dataset can be expressed as:

$$I_{a|b} = A_b d_b, \quad (1)$$

where the data vector $d_b$ is of dimensions (m×1), the image vector $I_{a|b}$ is of dimensions (p×1), and the migration matrix $A_b$ is of dimensions (p×m). Similarly, for the monitor (subscript m) the migration of the corresponding dataset can be written as:

$$I_{a|m} = A_m d_m, \quad (2)$$

where the data vector $d_m$ is now (n×1), the image vector $I_{a|m}$ is still (p×1), and the migration matrix $A_m$ is (p×n). In both cases, the image is evaluated at the same position ensemble a in the image domain.

One feature of the novel method is to formulate a decimation strategy that makes use of migration engine A to evaluate the similarity of two vintages in the image domain. Use of a common image domain allows two very different datasets to be accurately compared (e.g., towed-streamer and ocean-bottom data) without regard to differences in acquisition geometry, or other issues that make data-domain comparison difficult. For this reason, the novel method discussed herein overcomes the difficulties associated with traditional methods discussed in the Background section.

Next, consider a stationary part of the dataset, which should be referred to in the following as a "training" dataset. For example, the training set could be chosen in a time window known to correspond with data above the producing reservoir. A characteristic of the training dataset is that there is no 4D signal in it, so the migrated images should be equal if the decimating weights are correct.

A set of decimating weights $w_b$ and $w_m$ are introduced, and these decimating weights should satisfy the following equations:

$$I_{a|b} = A_b w_b d_b \quad (3)$$

and $$I_{a|m} = A_m w_m d_m, \quad (4)$$

where the baseline weights $w_b$ form a diagonal matrix of dimensions (m×m), and the monitor weights $w_m$ form a diagonal matrix of dimensions (n×n). Because these weights operate on the training dataset, then, if the decimating weights are correct, the following equality holds $I_{a|b} = I_{a|m}$.

Thus, an object of the method is to find, by optimization, the set of decimating weights that achieves this equality. To achieve this, it is possible to concatenate (i) the data vectors $d_b$ and $d_m$ into a single vector of length (m+n), and (ii) the weights matrices $w_b$ and $w_m$ into a diagonal matrix of dimensions ([m+n]×[m+n]). Then, inflate the number of columns and zero-pad the migration matrices $A_b$ and $A_m$ such that the finite coefficients of the baseline migration are placed in the first p rows and m columns of $A'_b$, which is (p×[m+n]), and the finite coefficients of the monitor migration are placed in the first p rows and last n columns of $A'_m$, which is also (p×[m+n]). Hence, equations (3) and (4) may be re-written as:

$$I_{a|b} = A'_b w d \quad (5)$$

and $$I_{a|m} = A'_m w d, \quad (6)$$

where $A'_b = [A_b | 0_b]$ for a zero-matrix $0_b$ of dimensions (p×n), $A'_m = [0_m | A_m]$ for a zero-matrix $0_m$ of dimensions (p×m), $$w = \begin{bmatrix} w_b & 0'_m \\ 0'_b & w_m \end{bmatrix},$$

for zero-matrices $0'_b$ of dimensions (n×m) and $0'_m$ of dimensions (m×n), $d=[d_b^T|d_m^T]^T$, and operation T means transpose.

Based on equations (5) and (6), a residuals vector r may be formed as follows:

$$r = I_{a|b} - I_{a|m} = A'_b wd - A'_m wd = (A'_b - A'_m) wd. \quad (7)$$

The set of decimating weights may be estimated by minimizing $r^T r$, or by use of some other norm (such as an L1-norm) to minimize the residuals.

The set of decimating weights can be specified to take the values $w=\text{diag}(w_{ii}=0,1)$ for $i=1, \ldots, m+n$. The term diag ($w_{ii}=0,1$) means that the matrix is diagonal, so it has values only on the main diagonal and zeros everywhere else. The values that are on the main diagonal can be either 0 or 1, depending on what produces the most similar image. By a weight of 0, that part of the data is not included in the migration. By a weight of 1, the data is included. Other values are also possible, but would make the problem less well conditioned. Furthermore, the weights may be allowed to vary either sample by sample, or to take blocks of values that represent the decimation of entire traces at a time.

The problem of estimating decimating weights by minimizing the residuals vector can be further conditioned by placing various regularizing terms on the weights. For example, the trivial solution of matching two vintages by making all weights zero can be avoided by requiring the set of complementary weights $\tilde{w}_{ii}$ to be $\tilde{w}_{ii}=1,0$ for $w_{ii}=0,1$, and to have minimum total magnitude $\tilde{w}^T \tilde{w}$. Similarly, the weights may be required to be flat (a minimum of the gradient of the weights), which promotes blocks of weights with similar values under the premise that adjacent traces are likely to hold similar information content. Finally, a condition that requires even trace density may be added to promote quality of the 3D migrated image after the image-domain 4D-binning.

A few practical details associated with the novel method are now discussed. In one application, the migration matrices are large, being of dimensions (p×[m+n]) for p image points and m+n datapoints in the combined baseline and monitor. Furthermore, the migration matrices are non-sparse because they contain coefficients distributed over the data-domain that includes Greens functions of the image points. Thus, the matrices may be too large to produce a solution of the entire datasets in one pass. Nevertheless, by dividing the data into overlapping spatio-temporal blocks, a set of weights may be obtained for each block, and then it is possible to separately decimate the data prior to a final migration.

Before the final migration takes place, further normalizing the data in the overlap zones by their duplication number allows the final images from each block to be summed together. By dividing the data into overlapping spatio-temporal blocks, one trace may be duplicated in the overlap of q blocks. The duplication number for this trace is then q. The process may thus be parallelized in both the image domain (choose small p blocks) and in the data domain (choose small m, n blocks), although one of the domains needs to be large enough to contain the migration operator at a given aperture.

In one application, the migration represented by the migration matrices need not be of the highest quality, because even something like a diffraction-stack migration provides a better domain in which to evaluate similarity of information content for decimation than the data domain. Limiting the migration aperture is a cheap way to avoid aliasing on the image grid without having to filter the operator.

Having determined the set of decimating weights, these can be applied to the data prior to a final migration using an imaging algorithm external to the subsurface 4D-binning process.

Thus, the proposed image-domain 4D-binning method would improve the 4D match between two surveys with very different acquisition geometries, in particular for towed-streamer and ocean-bottom node data.

The proposed new method links data-domain decimation to similarity measures for the common migrated-image domain. In one application, the novel method does not require explicit grouping of traces by spatial bin and offset or angle class. In another application, the method does not require a similarity measure based on surface or data-domain trace attributes. Consequently, the method advantageously improves the accuracy of 4D-binning when the input datasets have different acquisition geometries.

Figure 4:
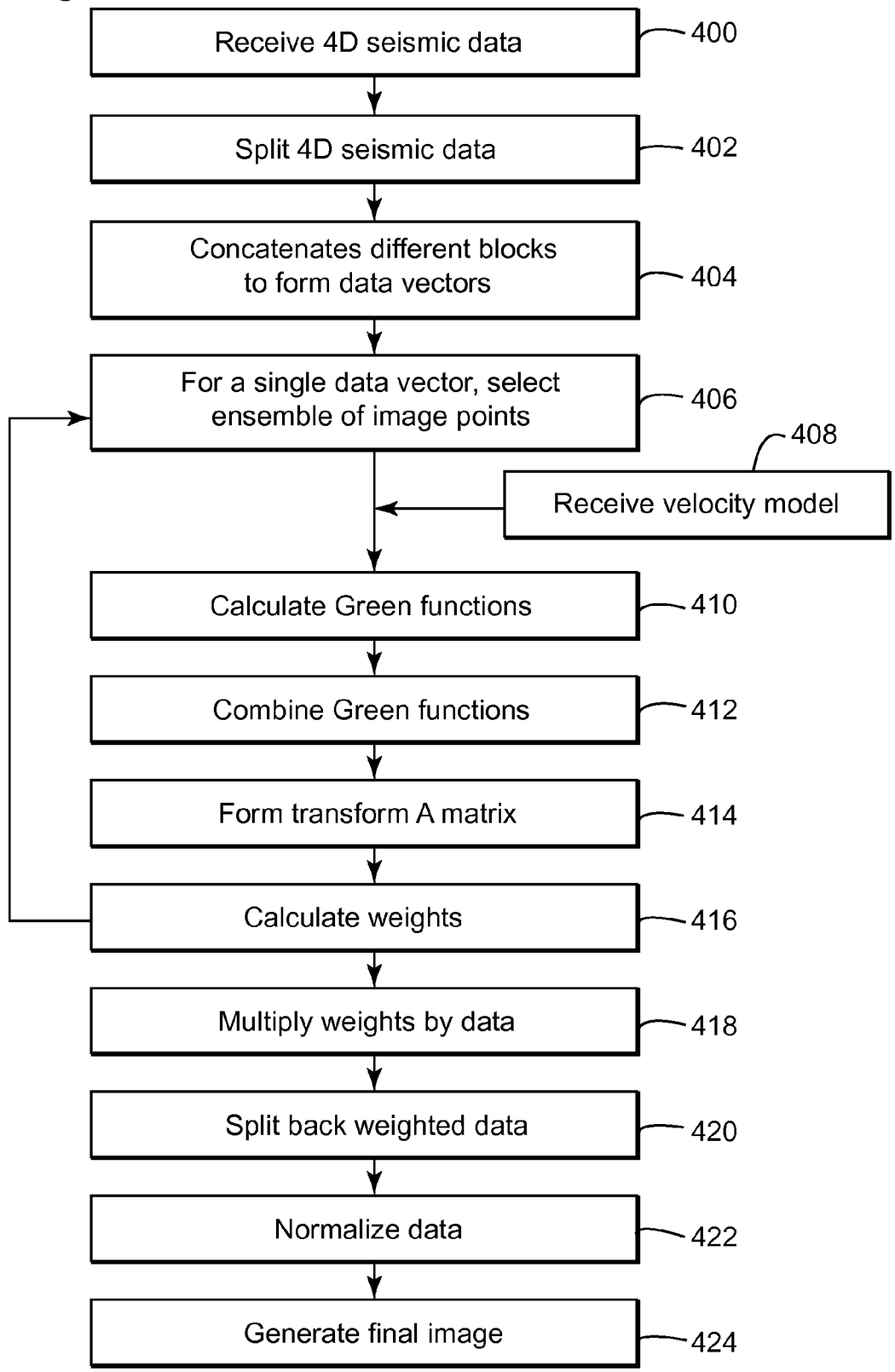
FIG. 4 is a flowchart illustrating a more detailed method for 4D-binning according to an exemplary embodiment.

According to an exemplary embodiment, discussed with regard to FIG. 4, a 4D-binning algorithm includes the following steps. In step 400, 4D seismic data is received. The 4D seismic data includes data from at least two different 3D seismic surveys. In one application, one set of seismic data has been collected with streamers while another set has been collected with OBNs. In step 402, the 4D seismic data (i.e., the baseline and monitor datasets) may be split into overlapping spatio-temporal blocks. The number of blocks may be one or more. In step 404, the algorithm concatenates one block from each survey into a working data vector d of length m+n for m datapoints in the baseline block and n datapoints in the monitor block. Thus, plural data vectors are formed as a result of this process. Next, the algorithm processes each data vector separately. Considering the data vector d, the algorithm advances to step 406, in which an ensemble of image points is defined for the data vector. The ensemble of image points (associated with $I_a$) is defined so that the data vector d is mapped to it by migration A. The image points may or may not be regularly distributed in the image-domain. The ensemble of image points may be the same during the entire process or it may be chosen for each data block.

Figure 5:
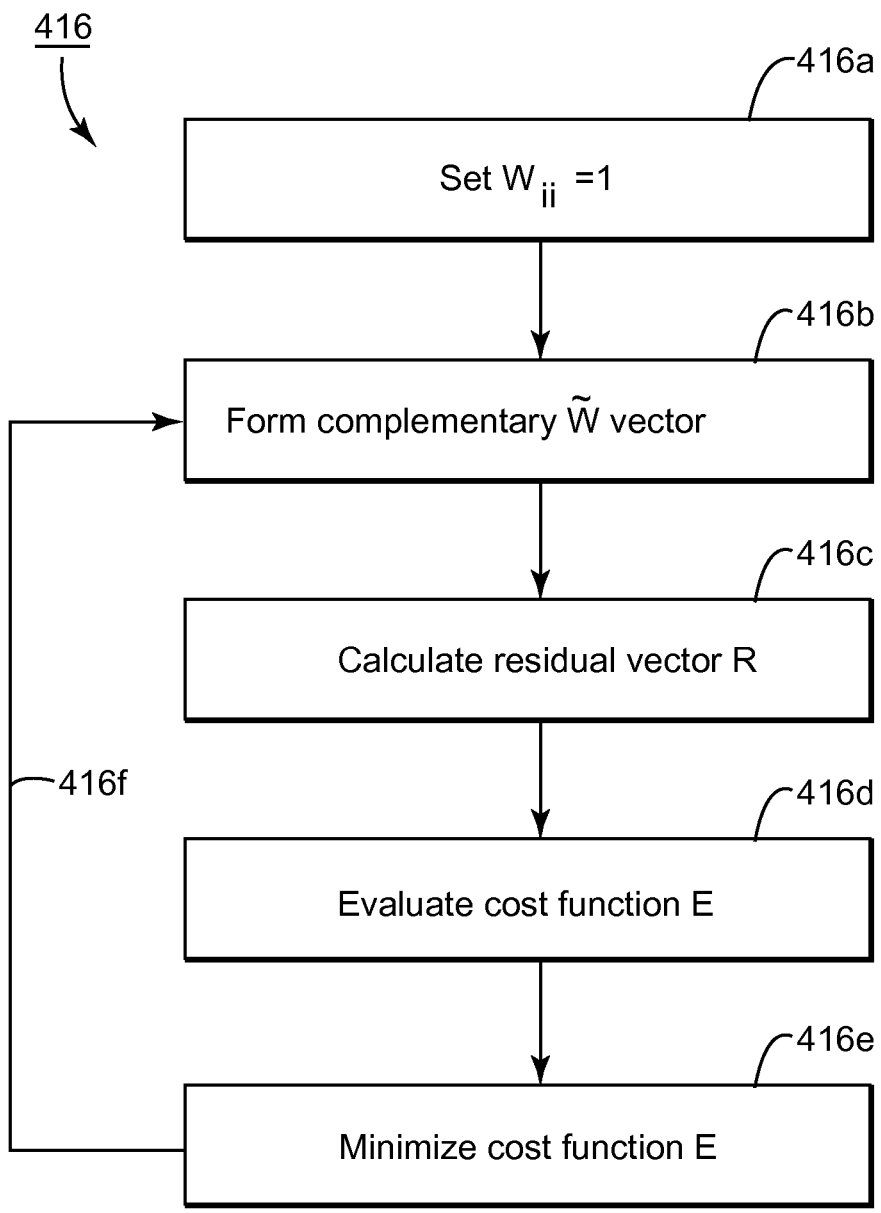
FIG. 5 is a flowchart illustrating a step of the method for 4D-binning of FIG. 4 according to an exemplary embodiment.

Next, a pre-defined velocity model is received in step 408. The velocity model describes the propagation speed of sound in water and subsurface, and this model may be obtained in many ways, as will be recognized by those skilled in the art. Because determining a velocity model is beyond the scope of this disclosure, no details are provided about the velocity model. Based on the velocity model, the algorithm calculates (e.g., by ray tracing), in step 410, Green's functions of seismic waves that propagate from each image point in the ensemble to the position of each source and each receiver in the data vector. The source and receiver Green's functions for each image point in the ensemble are combined in step 412 to define the coefficients of a Kirchhoff integral in a corresponding row of migration matrices $A'_b$ and $A'_m$. If another migration method is used, then a corresponding quantity is calculated and not the Kirchhoff integral. Having the migration matrices $A'_b$ and $A'_m$, a net transform matrix $A=A'_b-A'_m$ is formed. Next, based on the net transform matrix A, the weights w are formed in step 416. This step may include a number of substeps that are illustrated in FIG. 5. In step 416, a vector of weights $w=\text{diag}[w_{ii}]$ is formed for $i=1, \ldots, m+n$. In sub-step 416a, the diagonal elements of the vector are set to be one, i.e., $w_{ii}=1$. Then, in sub-step 416b, the corresponding vector of complementary weights $\tilde{w}$ is formed so that $\tilde{w}=[\tilde{w}_{ii}=1,0]$ when $w=[w_{ii}=0,1]$ and $i=1, \ldots, m+n$. Note that the notation $\tilde{w}_{ii}=1,0$ means a diagonal element of the vector w takes a value one or zero, and all other elements of the vector take a zero value. In sub-step 416c, the residuals vector r is calculated based on formula $r=Awd$. A cost function E is defined in sub-step 416d and then evaluated based on formula $E=r^T r + \tilde{w}^T \tilde{w}$. Note that additional terms may be added to the cost function to promote, for example, flatness in the spatial trace density, or to improve the quality of the 3D migrated images.

Cost function E is minimized with respect to the set of weights in sub-step 416e, using various mathematical methods. For example, minimization of the cost function may be achieved using the method of conjugate gradients applied to the vector of weights w. The algorithm may loop back in sub-step 416f to sub-step 416b (note that the set of weights may be varied at each step and thus, complementary weights need to be re-calculated in each step) until the cost function is minimized. Once the cost function has been minimized, the vector of weights that minimizes the cost function for the given data d is obtained. Then, the algorithm returns to step 406 to address the next vector of data until all data is processed.

Returning to FIG. 4, the vector of weights w for the entire data d is multiplied in step 418 by the vector of data d and then, in step 420, the weighted data vector is split back into the spatio-temporal blocks of step 402. From step 420, the algorithm advances to step 422, in which data may be normalized in the overlap zones of the blocks by their duplication number. After one or more processing steps, the final image of the surveyed subsurface is generated in step 424.

Figure 6:
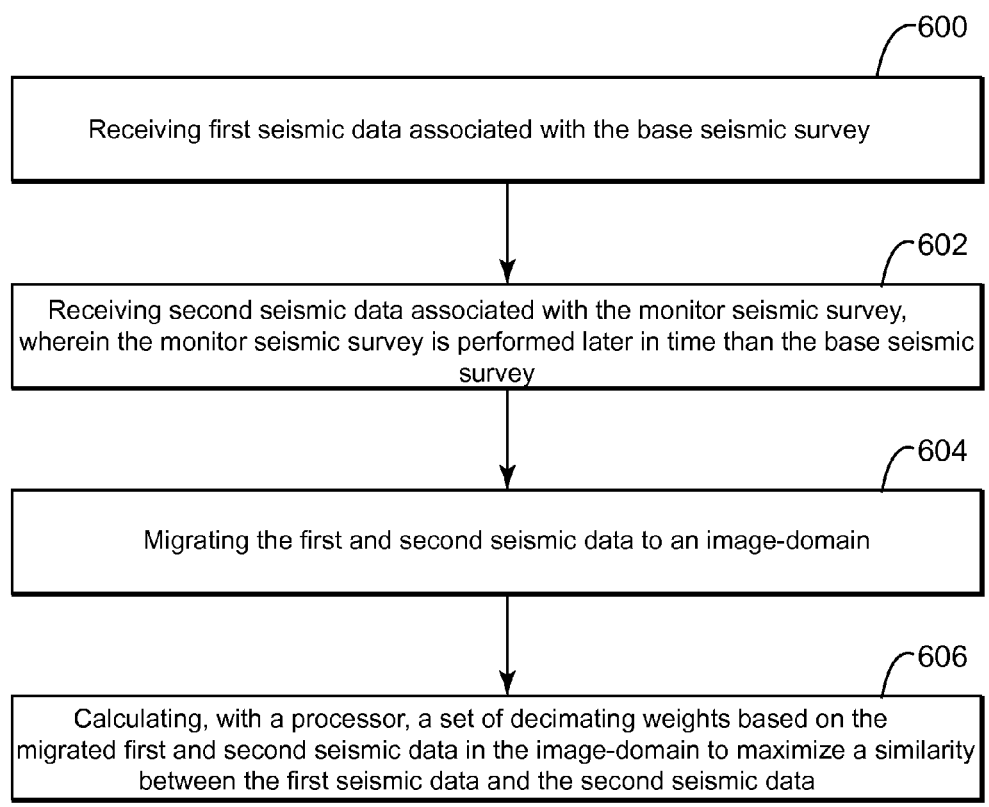
FIG. 6 is a flowchart illustrating a method for 4D-binning according to an exemplary embodiment.

According to an exemplary embodiment illustrated in FIG. 6, there is a method for increasing a similarity between a base seismic survey and a monitor seismic survey of a same surveyed subsurface during a 4-dimensional (4D) project. The method includes a step 600 of receiving first seismic data associated with the base seismic survey; a step 602 of receiving second seismic data associated with the monitor seismic survey, wherein the monitor seismic survey is performed later in time than the base seismic survey; a step 604 of migrating the first and second seismic data to an image-domain; and a step 606 of calculating, with a processor, a vector of decimating weights based on the migrated first and second seismic data in the image-domain to maximize a similarity between the first seismic data and the second seismic data.

Figure 7:
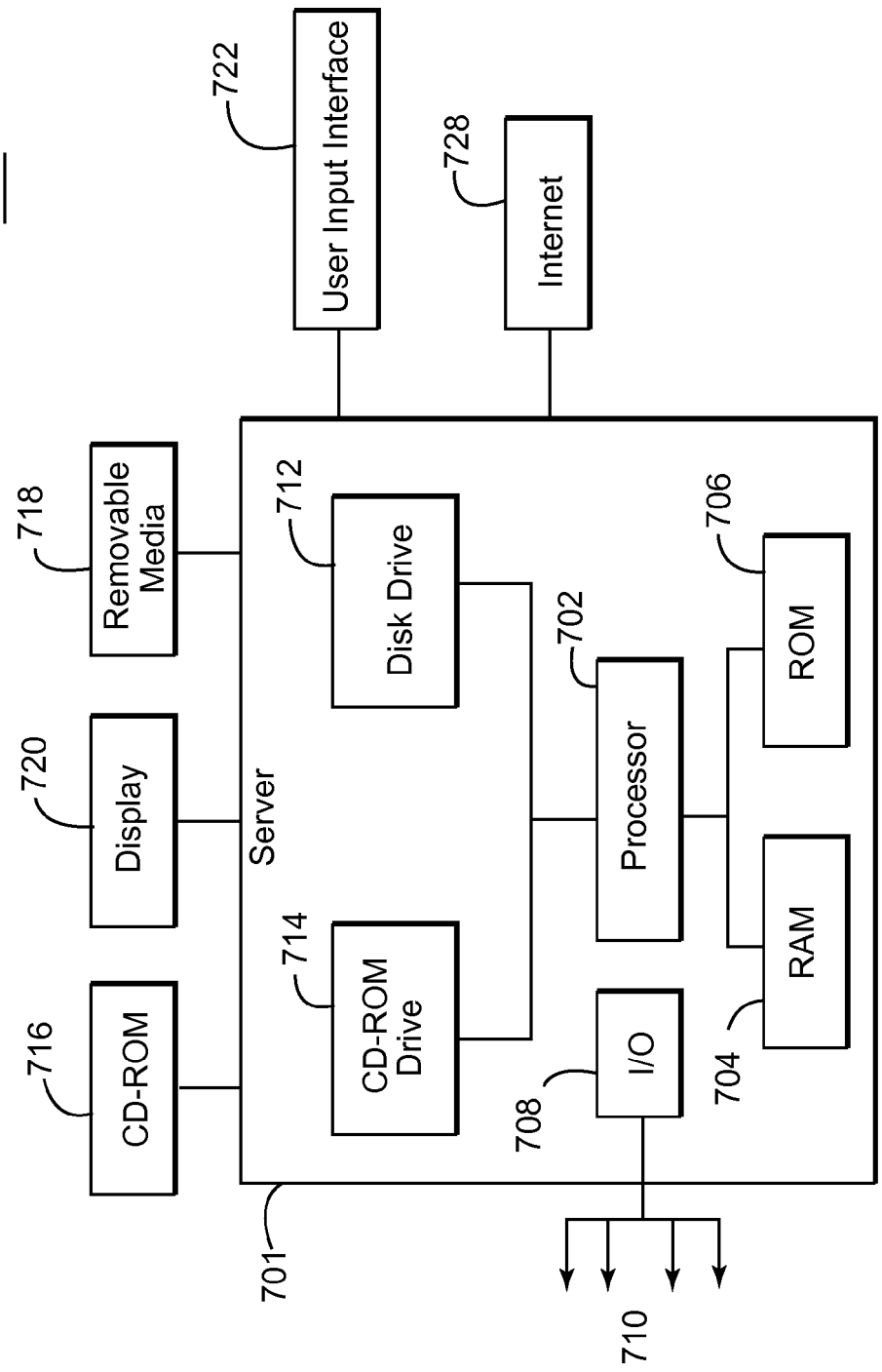
FIG. 7 is a schematic diagram of a computing device for implementing the above methods.

An example of a representative computing device capable of carrying out operations in accordance with the exemplary embodiments discussed above is illustrated in FIG. 7. Hardware, firmware, software or a combination thereof may be used to perform the various steps and operations described herein.

The exemplary computer device 700 suitable for performing the activities described in the exemplary embodiments may include server 701. Such a server 701 may include a central processor unit (CPU) 702 coupled to a random access memory (RAM) 704 and to a read-only memory (ROM) 706. ROM 706 may also be other types of storage media to store programs, such as programmable ROM (PROM), erasable PROM (EPROM), etc. Processor 702 may communicate with other internal and external components through input/output (I/O) circuitry 708 and bussing 710 to provide control signals and the like. Processor 702 carries out a variety of functions as are known in the art, as dictated by software and/or firmware instructions.

Server 701 may also include one or more data storage devices, including hard disk drives 712, CD-ROM drives 714, and other hardware capable of reading and/or storing information such as a DVD, etc. In one embodiment, software for carrying out the above-discussed steps may be stored and distributed on a CD-ROM or DVD 716, removable media 718 or other forms of media capable of portably storing information. These storage media may be inserted into, and read by, devices such as the CD-ROM drive 714, the drive 712, etc. Server 701 may be coupled to a display 720, which may be any type of known display or presentation screen, such as LCD or LED displays, plasma displays, cathode ray tubes (CRT), etc. A user input interface 722 is provided, including one or more user interface mechanisms such as a mouse, keyboard, microphone, touch pad, touch screen, voice-recognition system, etc.

Server 701 may be coupled to other computing devices via a network. The server may be part of a larger network configuration as in a global area network (GAN) such as the Internet 728.

As also will be appreciated by one skilled in the art, the exemplary embodiments may be embodied in a wireless communication device, a telecommunication network, as a method or in a computer program product. Accordingly, the exemplary embodiments may take the form of an entirely hardware embodiment or an embodiment combining hardware and software aspects. Further, the exemplary embodiments may take the form of a computer program product stored on a computer-readable storage medium having computer-readable instructions embodied in the medium. Any suitable computer-readable medium may be utilized, including hard disks, CD-ROMs, digital versatile discs (DVD), optical storage devices, or magnetic storage devices such as floppy disk or magnetic tape. Other non-limiting examples of computer-readable media include flash-type memories or other known types of memories.

The disclosed exemplary embodiments provide an apparatus and a method for increasing a similarity between base and monitor surveys in a 4D project by data-domain decimation implemented using image-domain measures of similarity. It should be understood that this description is not intended to limit the invention. On the contrary, the exemplary embodiments are intended to cover alternatives, modifications and equivalents, which are included in the spirit and scope of the invention as defined by the appended claims. Further, in the detailed description of the exemplary embodiments, numerous specific details are set forth in order to provide a comprehensive understanding of the claimed invention. However, one skilled in the art would understand that various embodiments may be practiced without such specific details.

Although the features and elements of the present exemplary embodiments are described in the embodiments in particular combinations, each feature or element can be used alone without the other features and elements of the embodiments or in various combinations with or without other features and elements disclosed herein.

This written description uses examples of the subject matter disclosed to enable any person skilled in the art to practice the same, including making and using any devices or systems and performing any incorporated methods. The patentable scope of the subject matter is defined by the claims, and may include other examples that occur to those skilled in the art. Such other examples are intended to be within the scope of the claims.

What is claimed is:

1. A method for increasing similarity between a base seismic survey and a monitor seismic survey of a same surveyed subsurface during a 4-dimensional (4D) project, the method comprising:
receiving first seismic data associated with the base seismic survey;
receiving second seismic data associated with the monitor seismic survey, wherein the monitor seismic survey is performed later in time than the base seismic survey;

migrating the first and second seismic data to an image-domain; and calculating, with a processor, a set of decimating weights based on the migrated first and second seismic data in the image-domain, to maximize a similarity between the first seismic data and the second seismic data.

2. The method of claim 1, further comprising:

applying the decimated weights to the first and second seismic data; and generating an image of the surveyed subsurface based on the decimated weights and the first and second seismic data.

3. The method of claim 1, further comprising:

splitting the first and second seismic data into overlapping spatio-temporal blocks; and concatenating data corresponding to pairs of blocks from each of the first and second seismic data blocks to form a data vector.

4. The method of claim 3, further comprising:

defining an ensemble of image points in the image-domain.

5. The method of claim 4, further comprising:

calculating a first migration matrix for the first seismic data and a second migration matrix for the second seismic data.

6. The method of claim 5, wherein an element of the first or second migration matrix is calculated based on Green functions that describe propagations (i) of a seismic wave from a seismic source to a point of the ensemble of image points and (ii) of a seismic wave from a seismic receiver to the point of the ensemble of points.

7. The method of claim 5, further comprising:

combining the first and second migration matrices to obtain a net migration matrix.

8. The method of claim 7, further comprising:

forming a vector of weights that have only diagonal elements equals to zero or one; and calculating a residuals vector based on the net migration matrix, the vector of weights, and the data vector.

9. The method of claim 8, further comprising:

defining a cost function based on the residuals vector and the vector of weights; and minimizing the cost function to obtain the decimating data weights.

10. The method of claim 9, further comprising:

multiplying the data vector with the decimating data weights to obtained weighted data.

11. The method of claim 10, further comprising:

splitting the weighted data back into the spatio-temporal blocks.

12. The method of claim 11, further comprising:

normalizing the weighted data by corresponding duplication numbers; and writing a block number to a header of each data trace of the first and second seismic data.

13. The method of claim 1, wherein one of the base and monitor surveys is a streamer based survey and the other of the base and monitor surveys is an ocean bottom node survey.

14. A computing device for increasing similarity between a base seismic survey and a monitor seismic survey of a same surveyed subsurface during a 4-dimensional (4D) project, the computing device comprising:

an interface configured to receive first seismic data associated with the base seismic survey and second seismic data associated with the monitor seismic survey, wherein the monitor seismic survey is performed later in time than the base seismic survey; and a processor connected to the interface and configured to, migrate the first and second seismic data to an image-domain, and calculate a set of decimating weights based on the migrated first and second seismic data in the image-domain, to maximize a similarity between the first seismic data and the second seismic data.

15. The computing device of claim 14, wherein the processor is further configured to:

apply the decimated weights to the first and second seismic data; and generate an image of the surveyed subsurface based on the decimated weights and the first and second seismic data.

16. The computing device of claim 14, wherein the processor is further configured to:

split the first and second seismic data into overlapping spatio-temporal blocks; and concatenate data corresponding to pairs of blocks from each of the first and second seismic data blocks to form a data vector.

17. The computing device of claim 16, wherein the processor is further configured to:

define an ensemble of image points in the image-domain, calculate a first migration matrix for the first seismic data and a second migration matrix for the second seismic data, combine the first and second migration matrices to obtain a net migration matrix, form a vector of weights that have only diagonal elements equals to zero or one, and calculate a residuals vector based on the net migration matrix, the vector of weights, and the data vector.

18. The computing device of claim 17, wherein the processor is further configured to:

define a cost function based on the residuals vector and the vector of weights, minimize the cost function to obtain the decimating data weights, multiply the data vector with the decimating data weights to obtained weighted data, split the weighted data back into the spatio-temporal blocks, and normalize the weighted data by corresponding duplication numbers.

19. The computing device of claim 14, wherein one of the base and monitor surveys is a streamer based survey and the other of the base and monitor surveys is an ocean bottom node survey.

20. A non-transitory computer readable medium including computer executable instructions, wherein the instructions, when executed by a computer, implement a method for increasing similarity between a base seismic survey and a monitor seismic survey of a same surveyed subsurface during a 4-dimensional (4D) project, the method comprising:

receiving first seismic data associated with the base seismic survey;

receiving second seismic data associated with the monitor seismic survey, wherein the monitor seismic survey is performed later in time than the base seismic survey;

migrating the first and second seismic data to an image-domain; and calculating, with a processor, a set of decimating weights based on the migrated first and second seismic data in the image-domain, to maximize a similarity between the first seismic data and the second seismic data.

* * * * *